(12) United States Patent
Newsom et al.

(10) Patent No.: US 6,860,381 B2
(45) Date of Patent: Mar. 1, 2005

(54) DECENTRALIZED DRIVE SYSTEM FOR A CONVEYOR

(75) Inventors: Gregory Scott Newsom, Brookland, AR (US); Anthony John Supine, Jonesboro, AR (US); Paul Dewayne Wallace, Bono, AR (US); Boyce Dean Bonham, Bono, AR (US)

(73) Assignee: Hytrol Conveyor Company, Inc., Jonesboro, AR (US)

( * ) Notice: Subject to any disclaimer, the term of this patent is extended or adjusted under 35 U.S.C. 154(b) by 25 days.

(21) Appl. No.: 10/354,434

(22) Filed: Jan. 29, 2003

(65) Prior Publication Data

US 2004/0144623 A1 Jul. 29, 2004

(51) Int. Cl.[7] .............................................. B65G 13/06
(52) U.S. Cl. ............................ 198/781.05; 198/781.06
(58) Field of Search ........................... 198/783, 781.05, 198/781.06, 781.11

(56) References Cited

U.S. PATENT DOCUMENTS

| | | | |
|---|---|---|---|
| 4,488,638 A | * 12/1984 | Morgan et al. ........ | 198/781.06 |
| 4,798,282 A | * 1/1989 | Sperduti et al. ....... | 198/781.06 |
| 5,285,887 A | 2/1994 | Hall | |
| 5,318,167 A | * 6/1994 | Bronson et al. ....... | 198/781.06 |
| 5,862,907 A | * 1/1999 | Taylor ................... | 198/781.05 |
| 5,904,239 A | * 5/1999 | Narisawa ..................... | 198/783 |
| 6,035,999 A | * 3/2000 | Hall ....................... | 198/781.06 |
| 6,460,683 B1 | * 10/2002 | Pfeiffer ................. | 198/781.05 |

\* cited by examiner

Primary Examiner—James R. Bidwell
(74) Attorney, Agent, or Firm—Alston & Bird LLP (57) ABSTRACT

An accumulation conveyor system for supporting and moving a plurality of objects. The conveyor system is divided into a plurality of zones wherein each zone includes a top and bottom conveying surface and wherein a space is defined between the top and bottom surfaces. Each zone also includes its own motor positioned external to the space between the conveying surfaces and coupled to the conveying surfaces via a non-slip connection. A control system is connected to the motor and controls the power to the motor so that the conveying surfaces in each zone can be moved independently. Whenever a sensor detects an empty downstream zone, it signals the control system of the upstream zone to power the motor and move the object to fill the empty zone. The control system may also be configured to allow a soft start wherein motor speed is increased gradually.

39 Claims, 10 Drawing Sheets

DECENTRALIZED DRIVE SYSTEM FOR A CONVEYOR

BACKGROUND OF THE INVENTION

1. Field of the Invention

The present invention is directed to conveyor systems, and more particularly to drive assemblies for accumulation conveyor systems.

2. Description of Related Art

Conveyors are used to transport goods and packages in all types of environments and experience especially heavy use in manufacturing and shipping industries. In addition, characteristics of the flow of goods and packages along such conveyor systems, such as timing and positioning of the goods and packages, must often be tailored to the needs of the manufacturer or shipper. Accumulator conveyor systems are divided into zones in which a driving force may be selectively applied to a conveying surface which provides each package with a stopping position. As a result, packages or goods may be accumulated in successive zones for eventual discharge from the conveyor.

As an example, U.S. Pat. No. 5,862,907 to Taylor ("Taylor") discloses an accumulation conveyor 10 that is divided into a plurality of accumulating zones A, B, C, D and E, as shown in FIG. 1 of Taylor. The conveyor 10 includes a conveying surface, in this case a plurality of rollers 14, that are selectively driven under the control of a plurality of accumulation modules 20A–E that correspond to the accumulating zones. Each module 20 is capable of communication with its neighboring or adjacent module in the upstream and downstream directions through communications cables 42A–E. Photoelectric or ultrasonic sensors 28 are used to determine the presence or absence of an item or package within each of the accumulating zones. Thus, when a sensor fails to detect a package in a downstream zone, its module communicates with the upstream zone to activate its conveying surface and convey an object held therein to the downstream zone.

Despite improvements in the control systems of conveyors, conventional conveyors have other areas in which improvements are needed. For instance, conventional conveyor drive systems include chain drives that positively drive every roller in roll-to-roll conveyors. The drive system is centralized and a single motor drives loops of chains that run under the conveyor from zone to zone. Each chain operates a drive shaft in each zone and engagement of the drive shaft is controlled by a mechanical clutch. The drive shaft, in turn, drives other chains that are connected to each individual roller in the zone. Such chain drive systems involve the use of many moving parts which generally decreases reliability and increases maintenance needs of the conveyor system.

One type of clutch often used in the chain drive systems is a spring wrap clutch. Spring wrap clutches are high-maintenance item, particularly over extended periods of use. Also, spring wrap clutches make noise when engaging and disengaging, and a large number of clutches combined with the noise of the other parts of the chain drive system result in a noisy conveyor system that is unpleasant for workers. An alternative to the spring wrap clutch is a pneumatic clutch, but pneumatic clutches are usually expensive and require a supply of compressed air to operate. Clutches also have the problem of causing a "hard start" wherein low-slip clutches engage suddenly, and present a jarring impact to the drive system.

Therefore, it would be advantageous to have a conveyor system that is capable of zero pressure control of accumulation while at the same time having a drive system capable of relatively quiet operation and requiring low maintenance, and a reasonable cost.

BRIEF SUMMARY OF THE INVENTION

The present invention addresses the above needs and achieves other advantages by providing an accumulation conveyor system for supporting and moving a plurality of objects. The conveyor system is divided into a plurality of zones wherein each zone includes a top and bottom conveying surface and wherein a space is defined between the top and bottom surfaces. Each zone also includes its own motor positioned external to the space between the conveying surfaces and coupled to the conveying surfaces via a non-slip connection. The non-slip connection avoids the noise, power loss and dust generated by clutch conveyor systems. A control system is connected to the motor and controls the motor speed (such as by controlling the frequency of power supplied to the motor) so that the conveying surfaces in each zone can be moved independently. Whenever a sensor detects an empty downstream zone, it signals the upstream zone of the control system to power the motor and move the object to fill the empty zone. The control system may also be configured to allow a soft start wherein motor power is increased gradually so as to avoid the impact that occurs with low-slip clutches.

In one embodiment, the present invention includes a conveyor system for supporting and moving a plurality of objects. Included in the conveyor system is a plurality of zones. Each one of the zones includes a top conveying surface and a bottom conveying surface, wherein a space is defined between the top and bottom conveying surfaces. The top conveying surface is capable of moving in at least a downstream direction and of supporting one of the objects. Also included in the conveyor system is a plurality of electrical motors (one for each of the zones) wherein each of the electrical motors is positioned external to the space between the top and the bottom conveying surfaces of its respective one of the zones. A control system is operably connected to each of the electrical motors and is capable of controlling the speed of each of the electrical motors independently. In this manner, the top conveying surface, and the object supported thereon, can be moved in the downstream direction independently of the other objects supported within the other zones.

Each zone may also include a drive assembly that operably connects the motor to the conveying surfaces of the zone. Preferably, the drive assembly includes a non-slip (e.g., clutchless) coupling that connects the conveying surfaces to a drive shaft of the motor.

As an additional aspect, the control system may be further capable of controlling acceleration of the conveying surfaces by controlling the speed of the electrical motors. For instance, a "soft start" may be employed wherein the controller gradually increases the frequency of the electrical power supplied to the motor. Acceleration control may even include directional control wherein the electrical motor, and the top conveying surface, are capable of reverse movement so as to convey objects in a upstream direction.

Generally, the preferred conveyor system is a relatively high load conveyor wherein the electrical motors each have an output of at least 0.5 horsepower and/or a torque rating of 687 in-lb or higher. On a conveying-load basis, the conveyor system should preferably be able to move objects weighing at least 100 pounds.

The conveying surfaces may be defined by a range of assemblies such as rubber belts, multiple parallel rollers or modular plastic belts. In the case of rollers, one of the rollers in each of the zones may be coupled to the drive shaft of the electrical motor by a non-slip coupling. The remaining rollers in the zone are slaved to the driven roller by a chain and sprocket assembly.

In another embodiment, the present invention includes a control system capable of controlling the speed of a motor in each of a plurality of conveyor zones. For such a purpose, the distribution of electrical power to each zone, and the motor of that zone, is controlled. For instance, a power controller and logic module in each zone (which may be any combination of hardware, software and firmware and which may be combined within a single, or multiple, physical housings or modules within the zone) cooperate to control the electrical power supplied to the motor in the zone. Preferably, the power is supplied from a single source and the power controllers and logic modules as a group control distribution of the electrical power.

In addition, the control system may include a plurality of power and communication lines with one or more connections that allow a connection to be made quickly between zones and, conversely, a "quick-disconnect" of each zone from the other zones. For instance, the power controller of each zone may include a power line connector and a power line, and the logic module of each zone may include a communication line connector and a communication line. Thus, each zone power controller and logic module may be connected, via the connectors, to the lines of the controller and module in the upstream zone, and to the controller and module in the downstream zone via its own power and communication lines.

Optionally, the power controller in each zone may have its own current overload guard or protection feature, such as a breaker switch or additional circuitry capable of reducing the electrical power distributed to its motor that protects against current overload of its motor.

In another embodiment, the present invention includes a conveyor system for supporting and moving a plurality of objects. The conveyor system includes a frame having a pair of laterally spaced support members extending in a machine direction. A plurality of zones separate the support members into discrete portions. Each of the zones includes a plurality of rollers extending between, and rotatably supported by, the discrete portions of the support members of the zone. In each zone is a drive roller, which is one of the rollers and which is slaved to the other rollers in the zone via a chain and sprocket assembly. The conveyor system further includes a plurality of electrical motors wherein each of the electrical motors includes a drive shaft operably connected to the drive roller of a respective one of the zones via a non-slip coupling. Each of the motors is supported by one of the support member portions on a side of the support member portion opposite the rollers. A control system is further included and is operably connected to each of the electrical motors and is capable of independently controlling the speed of each motor, such as by controlling the frequency of the electrical power supplied to the motor. In this manner, the rollers, and any one of the objects supported thereon, can be moved in the machine direction independently of the other objects supported on the rollers in the other zones.

The accumulation conveyor of the present invention has many advantages. For instance, the use of one motor drive system in each of the accumulation zones allows each zone to be operated independently of the others. Conveyor size can be easily increased because each zone has its own logic module, controller and gear motor that can be quickly connected, and disconnected. Also, the use of a non-slip coupling in the drive assembly reduces the noise, dust and power loss associated with clutch driven, and other slip-prone, power transmission systems. In addition, the ability of the control system to soft start, or gradually increase the speed of, the motor reduces wear on the conveyor system and allows more stable support for objects on the upper conveying surface. Soft starts also facilitate the use of fairly large motors, such as a motor with a torque rating of about 687 in-lb that is capable of conveying up to 3,000 lbs.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 7:
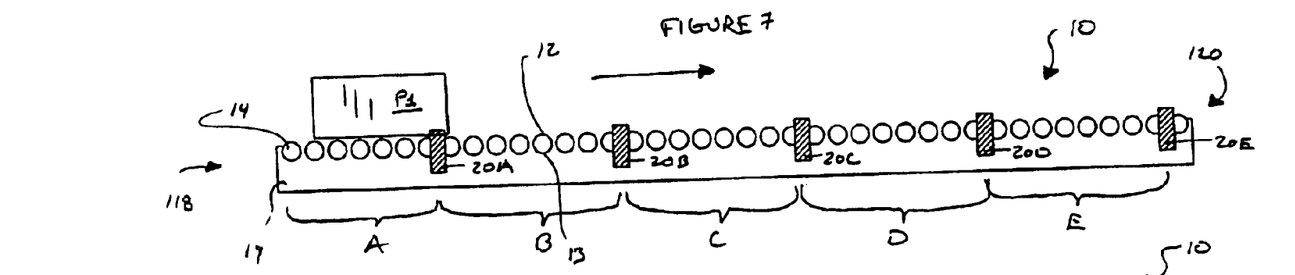
FIG. 7 is a diagrammatic representation of the conveyor of FIG. 6 with a package P1 at an infeed end and in either a singulation or slug control modes.

A zero-pressure accumulation conveyor 10 includes an upper (top) conveying surface 12 and a lower (bottom) surface 13 defined, in this case, by the tops and bottoms, respectively, of a plurality of rollers 14, as shown in FIG. 7. It should be noted, however, that other types of conveying surfaces, such as belts, slats, or modular plastic belts may be used. In the case of one type of belt conveying surface the upper portion of the belt is the conveying surface that supports objects being conveyed thereon and defines the upper conveying surface 12, while the lower surface 13 is defined by the lower portion of the belt on its return trip to the drive roll. The lower surface does not typically support packages or other objects for conveyance. In addition, the lower surface may be defined by the underside of a single layered moving belt or object that moves in the downstream direction and also defines the top conveying surface, but has no return portion.

The conveyor 10 is divided into a plurality of accumulating zones identified by the letters A, B and C such that there are three accumulating zones. The conveyor 10 has a direction of product flow over the upper conveying surface 12 which is arbitrarily chosen as from accumulating zone A towards accumulating zone C. Therefore, accumulating zone A is the first accumulating zone, generally known as the infeed end accumulating zone, while accumulating zone C is the last accumulating zone, generally known as the discharge end accumulating zone.

Figure 1:
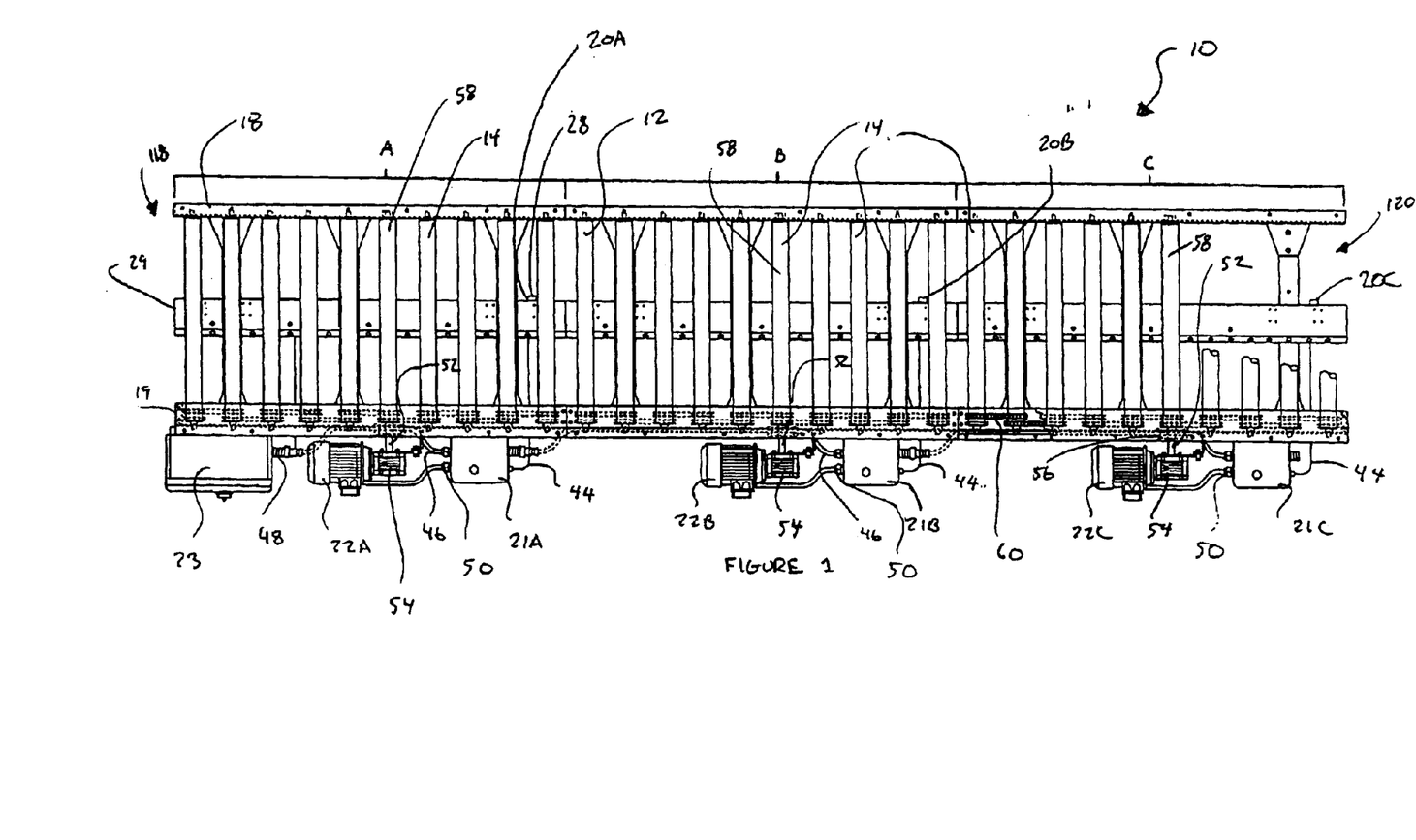
FIG. 1 is a top plan view of an accumulation conveyor system of one embodiment of the present invention wherein the conveyor has three zones.
Figure 2:
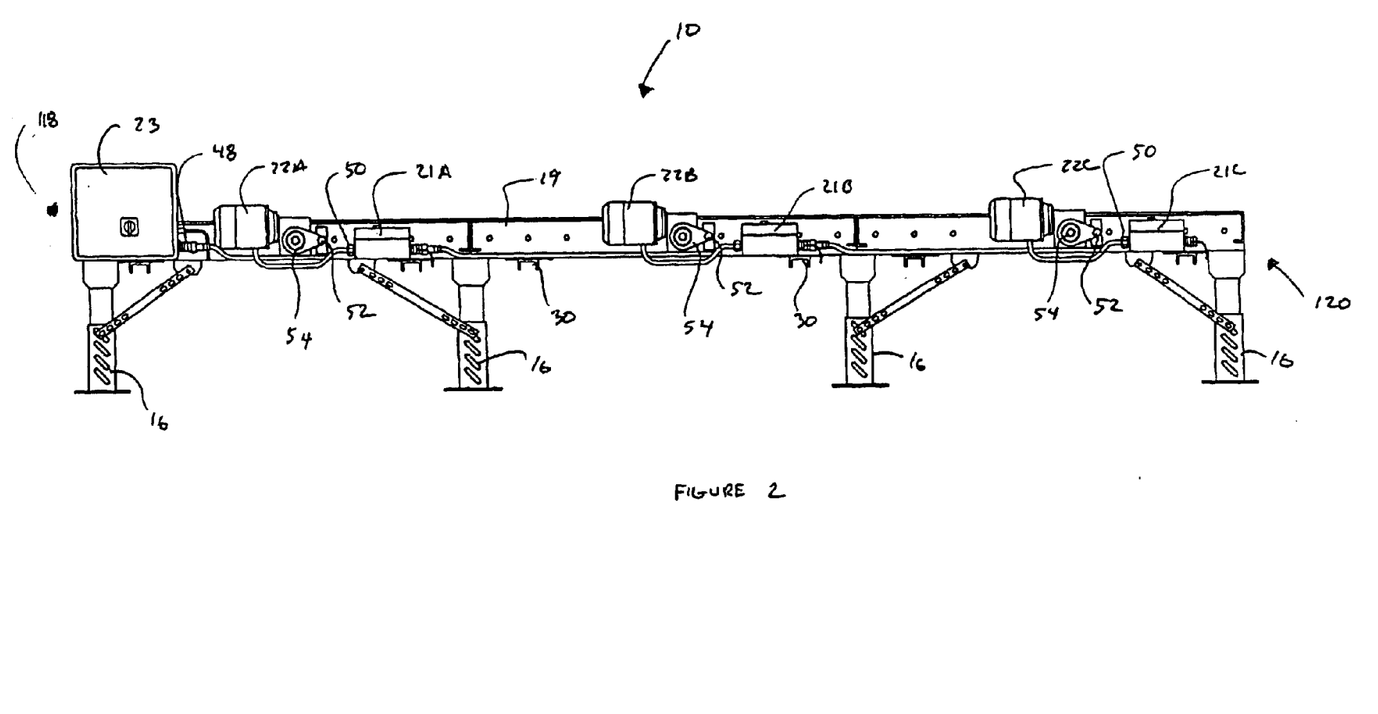
FIG. 2 is a side elevation view of the conveyor system of FIG. 1.
Figure 3:
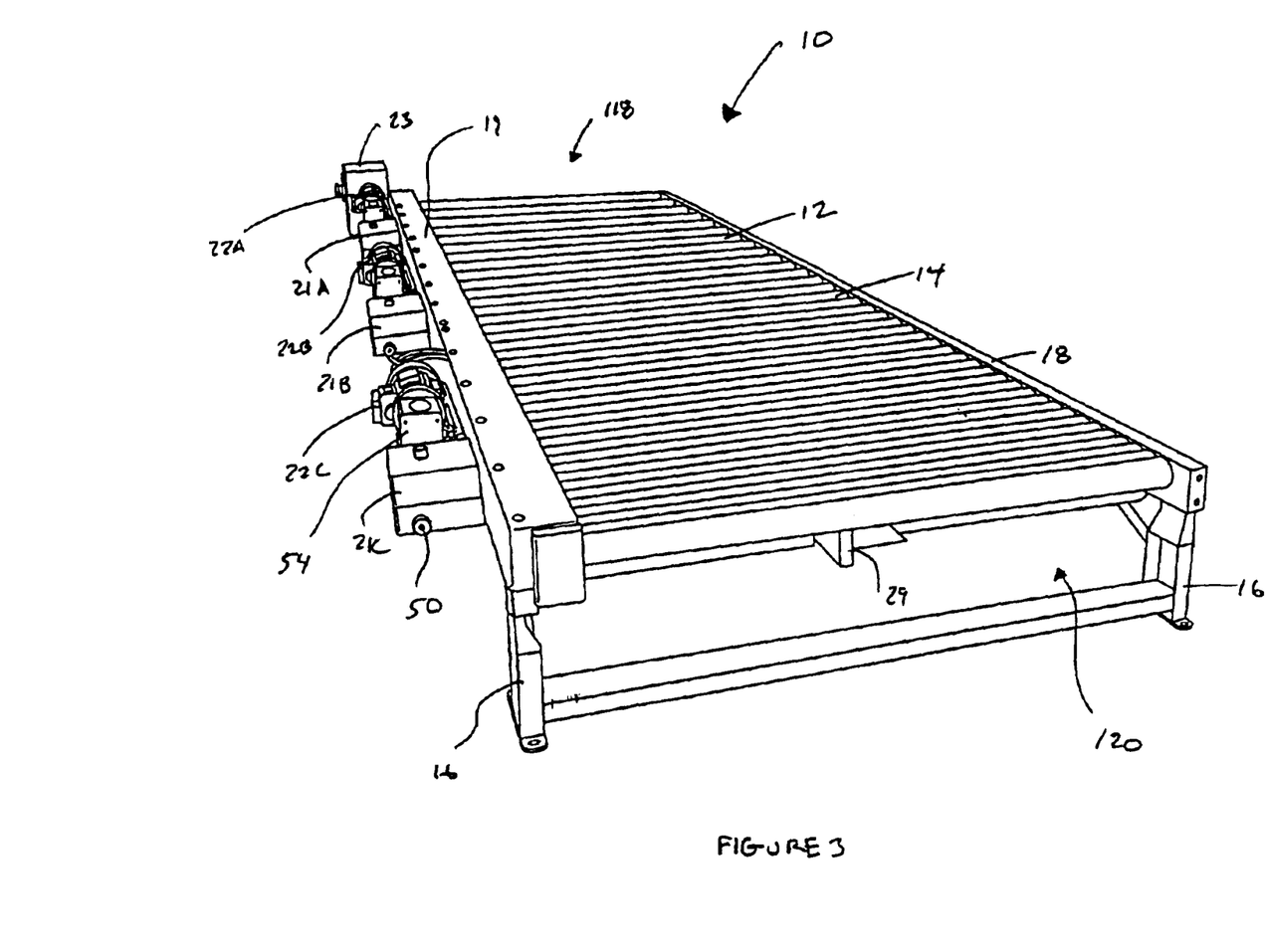
FIG. 3 is a plan view of the conveyor system of FIG. 1 as seen from its discharge end.
Figure 4:
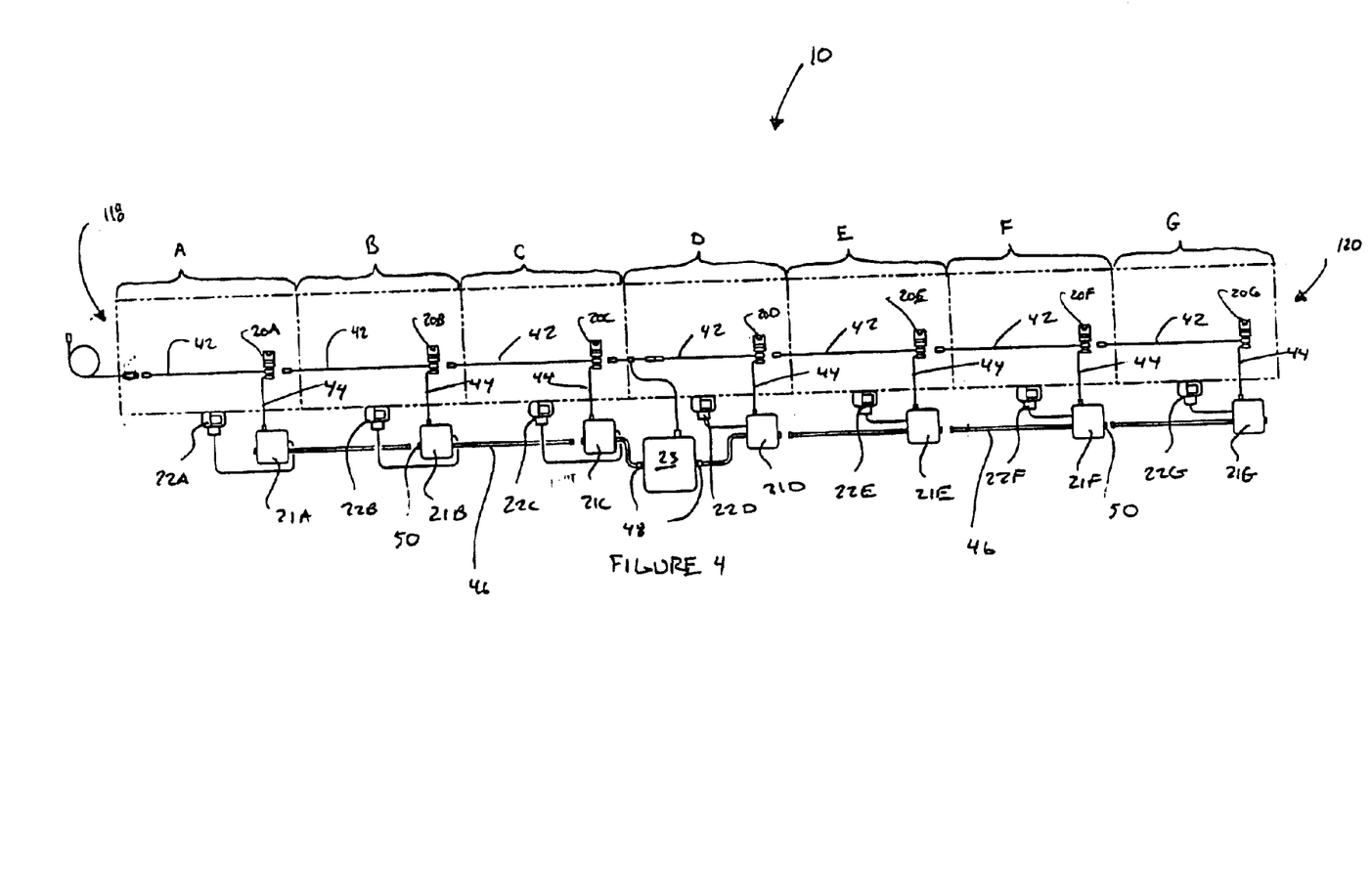
FIG. 4 is a schematic wiring diagram of a conveyor system of another embodiment of the present invention wherein the conveyor system has seven zones.

It should be noted that the number of zones illustrated in FIGS. 1–3 is arbitrary as there could be any number of accumulating zones depending upon the overall length of the particular conveyor or other conveyor design considerations. For instance, an alternative embodiment of the present invention illustrated in FIG. 4 shows a conveyor 10 having seven zones labeled A through G. As yet another example, embodiments of the present invention illustrated in the remaining FIGS. 6–14 show a conveyor 10 having five zones labeled A through E.

Referring again to FIGS. 1–3, the rollers 14 are rotatably supported between a first side rail 18 and a second side rail 19 which are in turn supported by legs 16. Positioned below the rollers 14 is a center rail 29 that extends between and parallel to the side rails 18, 19. The center rail 29 is supported in its position by a plurality of channels 30 fixed to the underside of the rails 18, 19 and extending therebetween in a cross-conveyor direction. Together, the side rails 18, 19, 29, channels 30 and legs 16 form a conveyor support frame.

The side rail 19 supports a plurality of zone controllers 21A, 21B and 21C and a plurality of drive motors 22A, 22B and 22C. Each controller is paired with an adjacent one of the drive motors, with each controller/drive motor pairing positioned in a respective one of the zones A–C, as is indicated by the reference numbers. Side rail 19 further supports a disconnect and power supply panel 23 which is positioned in the embodiment illustrated in FIGS. 1–3 in zone A. In the embodiment illustrated in FIG. 4, alternatively, the power supply panel 23 is in zone D. Center rail 29 supports a plurality of accumulation logic modules designated 20A, 20B and 20C and also corresponding to the accumulating zones A–C. As shown best by the embodiment illustrated in FIG. 4, each logic module 20 is supported beneath-the rollers 14 in its respective one of the zones A–C at approximately the downstream end of the zone for reasons described more fully below.

Figure 5:
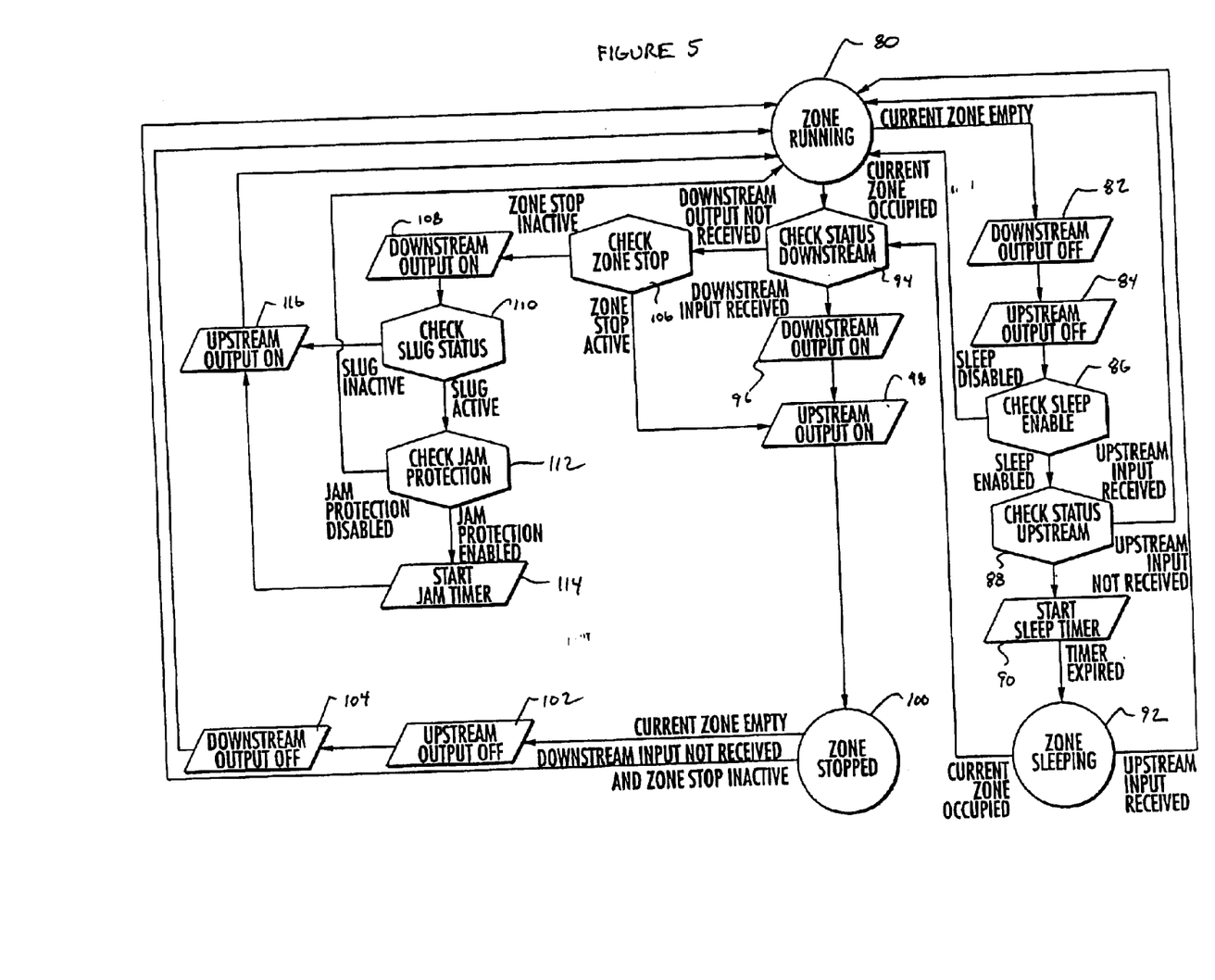
FIG. 5 is a state diagram of the control logic used in the conveyor system of FIG. 1.

Each logic module 20 includes a housing or casing 24 that encloses electrical logic circuitry that receives various input signals and transmits various output signals based on internal evaluations as flow diagrammed via a state diagram shown in FIG. 5. The logic circuitry may include a microprocessor and other necessary components, or may be another type of logic structure that will perform the functions diagrammed in FIG. 5. Additional details about the modules in general, and the logic circuitry in particular, is available in commonly owned U.S. Pat. No. 5,862,907 which is incorporated herein by reference.

Figure 15:
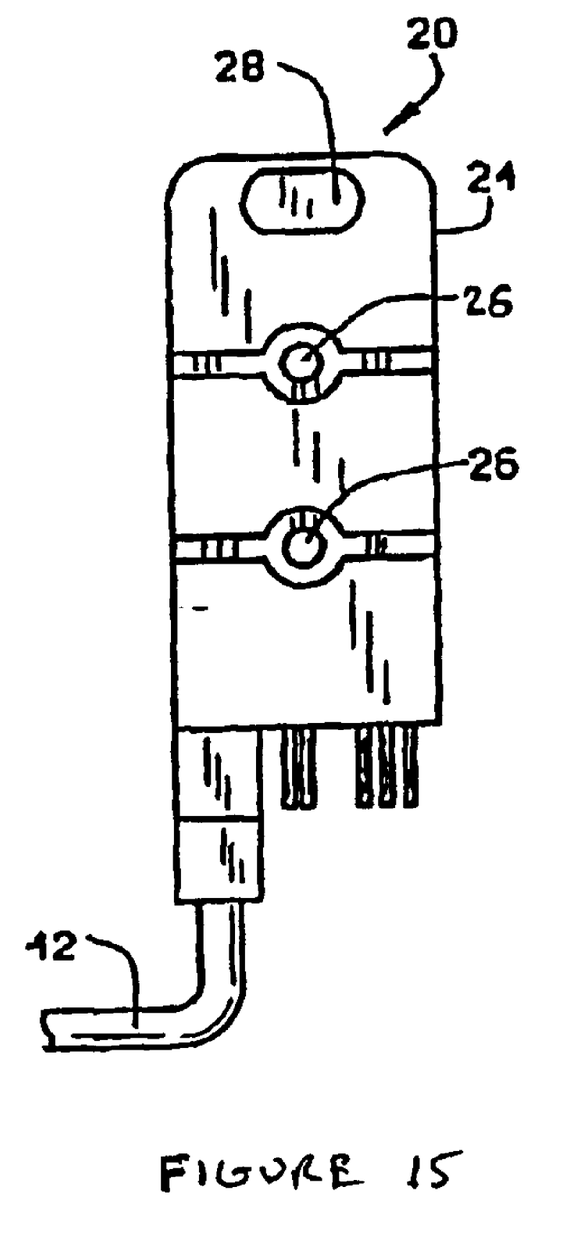
FIG. 15 is a control logic module capable of executing the state diagram of FIG. 5.

The casing 24 of each module 20 includes a pair of bores 26 extending therethrough that allow the casing to be mounted to a center rail 29 underneath the rollers or conveying surface 12 of its respective one of the zones, as shown in FIGS. 1, 4 and 15. The center rail is aligned with, and positioned between, the side rails 18 and 19. Each module 20 further includes a sensor 28 on an upward face so that a field of view of the sensor extends between a pair of the rollers 14. Each sensor 28 is in communication with the logic circuitry of the module 20 in its respective zone and the modules in the upstream and downstream zones via the module communication lines 42.

The sensor 28 is used to determine the presence or absence of an item or package within the respective accumulating zone and to send a signal to its respective logic circuitry indicating the same. The sensor may be a photoelectric sensor, a proximity sensor, an ultrasonic sensor, or any other type of sensor that is capable of detecting the presence or absence of an item within the respective accumulating zone and providing a signal indicative of the same to the logic circuitry. Different types of sensors, and different types of conveying surfaces, may require different positioning of the sensors. For instance, each sensor 28 may be mounted on one of the side rails 18, 19 and have a field of view in the cross-conveyor direction. Such side mounting would be advantageous when belt conveying surfaces are used because the belt would otherwise block the view of a sensor mounted under the conveying belt surfaces.

Each logic module 20 is in communication with its neighboring or adjacent module, both in the upstream direction and the downstream direction relative to conveyor flow, where possible, through communications cables 42. Therefore, module 20B is in communication with upstream module 20A and downstream module 20C, as shown in FIG. 1 (only a portion of each module is visible due to the presence of the center rail 29). On the other hand, accumulating zone A is only in communication with its adjacent downstream module 20B, while accumulating zone C is only in communication with its adjacent upstream module 20B. Communication of the logic module 20 of the first and last zones would be the same for conveyors of other lengths, such as zone A in the seven-zone conveyor of FIG. 4 being only in communication with downstream zone B, and zone G being communication only with upstream zone F, while the intervening zones are each in communication with the logic module of both the upstream and downstream zones.

Each zone controller 21 has logic circuitry specific to controlling the operation of a respective one of the motors 22 in its zone. Each controller 21 includes a pair of power connections 50 on its upstream and downstream sides. Attached to the power connections 50 are power supply lines 46 that connect the controllers in a series ending in the power supply panel 23. Notably, the zone controller 21 at the discharge end 120 has an open power connection (zone C in the embodiment illustrated in FIG. 1) that allows the addition of further downstream zones for longer conveyors. In addition to being able to switch its respective motor 22 on and off, each zone controller 21 is further capable of varying the speed of each motor, such as by controlling the amount or frequency of power supplied to each motor. Such power control allows for a "soft start" wherein the motor, and hence conveying surface 12 speed, is gradually increased. Beyond soft starts, the overall speed of each motor 22 can be controlled to control throughput of conveyed objects (e.g., packages) and to further facilitate zero-pressure accumulation.

The power supply panel 23 may include one, or more, connections 48 for attachment of the corresponding number of power supply lines 46, allowing the panel to be positioned in any selected upstream (single output as shown in FIG. 1) or downstream position with controllers 21 in either, or both (dual output as shown in FIG. 4), the upstream and downstream directions. The power supply panel 23 is a 208/230 volt, 3 phase, 60 Hz power supply for 1–5 zones at single-output, or 1–10 zones at dual output. The zone capacity may be doubled with a 460 volt, 3 phase, 60 Hz motor for 1–10 zones at single output, or 1–20 zones dual output. Despite the aforementioned preferences, the voltage rating, and other capabilities, of the power supply panel 23 can be changed to suit increased zone and load requirements of the conveyor and, in particular, increased capacity of the drive motors.

Each drive motor 22 could be 208, 230 or 460 volt, ½ horsepower motor that has a torque rating of at least 100 in-lb and preferably about 687 in-lb (for a conveyor load rating of 3,000 lb), or even higher depending upon the desired loads to be moved by the conveyor. Such motors have a life expectancy when used in the present system of about 100,000 hours which is advantageous for low-maintenance and downtime on conveyors that experience heavy use and move heavy loads. Each drive motor 22 also includes a drive shaft 52, and, if necessary, a gearbox or reducer 54 for reducing the output speed of the drive motor at the shaft 52. The reducer 54 illustrated in FIG. 1 also allows mounting of the motor at a right angle to the machine direction for a lower profile than a straight-mounted motor. Reducing the profile of the motor is advantageous due to the large size of the motors necessary to drive higher conveyor loads.

The conveyor system 10 of the present invention also has a drive assembly that includes a non-slip coupling 56 that connects the end of the motor shaft 52 to a driven roller 58 of the rollers 14. The remaining ones of the rollers are slaved to the driven roller 58 by a chain drive system wherein individual chain loops 60 extend about sprockets fixed to adjacent pairs of the slaved rollers. In this manner, driving of the driven roller 58 by the motor 22 also drives the remaining rollers 14 and causes objects supported on the rollers to move in the upstream or downstream direction. Of course, with the use of alternative conveying surfaces, chain drives may not be necessary, or optimal, such as with belt conveyors. In a belt conveyor, the driven roller drives a belt wrapped around a second, non-driven roller and the length of belt between the rollers defines the zone. Such an alternative conveying surface, however, would still benefit from the use of a non-slip coupling which has several advantages independent of the type of conveying surface.

Advantageously, unlike conventional drive systems, the conveyor 10 does not require extended chains, belts or shafts because power from a single motor need not be transmitted along the entire conveyor. In addition, the present conveyor system does not require the use of clutches to selectively transmit power to the different zones. A non-slip transmission system allows greater amounts of the power generated by the motor 22 in each of the zones to be transmitted to the conveying surface 12 (thereby increasing conveyor load capacity), reduces the noise associated with clutch engagement and eliminates the dust generated by clutch-driven systems. Particularly advantageous is a combination of the non-slip transmission with the soft-start, variable power control of the zone controllers 21A–C which replaces the hard start caused by relatively low slip clutches. Notably, non-slip is used herein to refer to connections in which no slip occurs, which excludes even low-slip clutches. Non-slip also excludes other apparatuses that experience slip during power transmission, such as fluid power transmissions.

Non-slip couplings and transmissions can include hard connections, wherein the drive shaft 52 of the motor 22/reducer 54 is coupled directly to the driven roller 58, such as by a collar or key and slot combination. Alternatively, a soft coupling, such as an elastic or flexible coupling, may be used that transmits power without slip, but facilitates a soft-start of the upper conveying surface 12. In addition, a combination of connections could be used to form a non-slip coupling or connection between the driven roller 38 to the drive shaft 52 if space constraints dictate that the motor be placed in an irregular position. For instance, the drive motors 22 could be placed beneath the lower conveying surface (i.e., below the plurality of rollers 14 in the illustrated embodiments) in each of the zones A–C so as to minimize the lateral profile of the conveyor 10. Of course, such a motor placement would limit the length of the legs 16 and inhibit conveyor configurations wherein the upper conveying surface 12 is very close to the floor.

The aggregation of accumulation modules 20A–C and controllers 21A–C of FIGS. 1–3 constitute an accumulation control device or system that works in conjunction with the drive motors 22 and associated non-slip drive couplings to control the flow of packages along the conveyor. In response to inputs from the logic circuitry of each module 20, each zone controller 21 is capable of switching its respective drive motor 22 on and off by controlling the power supplied to the drive motor. Therefore, each of the zones A–C may have its drive motor 22 individually controlled via input from its respective controller 21 and logic module 20. Optionally, the controller 21 and/or logic module 20 may be further configured to determine when the drive motor is experiencing overload and to shut off or reduce power to the motor 22.

It should be noted that although accumulation control is embodied in circuitry in separate modules and controllers in the illustrated embodiments, such circuitry could be combined in a single unit. Also, it should be noted that the modules and controllers could also be embodied in software, hardware, firmware, or combinations thereof and still execute accumulation control. However, the positioning and hardware circuitry of the embodiments illustrated (and other embodiments wherein the control logic and power control system for each zone is contained within the zone and easily connectable to upstream and downstream zones) herein are preferred for reasons of durability and the ease of adding additional zones, or combining zones, to increase the length of the conveyor system.

The logic circuitry flow or evaluation of the various inputs and outputs of each module 20 is depicted in the aforementioned state diagram of FIG. 5. There is one module for each accumulating zone and any reference to a module and "its" accumulating zone refers to the accumulating zone under the purview of the referenced module. Any reference to "a signal" or "no signal" is any form of communication that accomplishes the intended purpose. In the state diagram there are three STATES, the ZONE RUNNING STATE 80, the ZONE SLEEPING STATE 92, and the ZONE STOPPED STATE 100. Each "step" along the way is a logical question whose answer must be "true" to proceed therealong to the next STATE in accordance with the general principles of STATE diagrams.

The main or normal state of each module is the ZONE RUNNING STATE 80. When power is applied to the conveyor and the control device, each module transmits a drive signal to the drive motor 22 for the respective accumulating zone which drives its respective drive one of the rollers 14, and thus ZONE RUING STATE 80. Next, the logic circuitry checks its sensor to determine whether a package or item has been detected within the respective accumulating zone. Such checking by the logic circuitry may take the form of polling, of received signal(s) from the sensor, or of non receipt of signal(s) from the sensor.

In the ZONE SLEEPING STATE 92, if no packages are detected by the sensor and thus the current accumulating zone is empty, the CURRENT ZONE EMPTY flow path is correct, and the logic circuitry flow proceeds along the flow path to the query DOWNSTREAM OUTPUT OFF 82. In response to the CURRENT ZONE EMPTY, at the DOWNSTREAM OUTPUT OFF 82, the logic circuitry transmits a no product detect signal (or e.g., stops sending a product detect signal) to the downstream accumulating module. Next, the logic circuitry proceeds to the UPSTREAM OUTPUT OFF 84 and a no product detect signal is transmitted to the upstream accumulating module.

Next, the logic circuitry proceeds to the CHECK SLEEP ENABLE 86 where the position of a sleep switch (not shown) is checked to see if the SLEEP MODE function is enabled or disabled. If the SLEEP MODE is enabled, the logic circuitry proceeds to the CHECK STATUS UPSTREAM 88 to see if a package has been detected within the immediately upstream accumulating zone. If a package has been detected in the immediately upstream accumulating zone, then the immediately upstream accumulation module will accordingly transmit a product detect signal to its immediately downstream accumulation module, and an UPSTREAM INPUT RECEIVED answer maintains the accumulation zone running. If however, an UPSTREAM INPUT NOT RECEIVED is the answer to the CHECK STATUS UPSTREAM 88, the logic circuitry proceeds to the START SLEEP TIMER 90 and the sleep timer starts.

The timer period is a predetermined time length, that is arbitrarily chosen as five (5) seconds, fifteen (15) seconds, or (30) seconds. If a product detect signal is received from the immediately upstream module, then the logic circuitry transmits a drive signal to the drive motor 22 to start the zone running, STATE 80. If however, the TIMER EXPIRES, the module transmits a no drive signal and the zone enters the ZONE SLEEPING STATE 92 whereupon the drive force is disengaged from the accumulating zone and the zone sleeps. Again, the logic circuitry checks to determine whether a product detect signal has been received from the immediately upstream module and, if it has, the zone is set to running by the transmission of a drive signal to the respective drive motor 22.

The accumulating zone remains in the sleep mode until either 1) a product detect signal is received from the upstream accumulation module (indicating a package within the immediately upstream accumulating zone) or 2) the current accumulating zone becomes occupied by a package. If the latter is the case, the logic circuitry continues its logic flow to the CHECK STATUS DOWNSTREAM 94 which will be described in conjunction with the ZONE RUNNING STATE 80. Alternatively, if the sleep function is disabled by the sleep switch, the flow brings the logic circuitry back to the ZONE RUNNING STATE 80 at the CHECK SLEEP ENABLE 86 step.

While the module is in the ZONE RUNNING STATE 80, if the respective sensor is detecting a package within its accumulating zone, then the current zone is occupied and the logic circuitry proceeds to the CHECK STATUS DOWNSTREAM 94. If a product detect signal is being received from the immediately downstream module then the downstream accumulating zone is occupied. At this point, the current module is both detecting a package within its zone and receiving a product detect signal from the immediately downstream module. The current module then transmits a product detect signal to the downstream module, the DOWNSTREAM OUTPUT ON 96 and transmits a product detect signal to the upstream module, the UPSTREAM OUTPUT ON 98.

Thereafter, the accumulating zone is stopped, ZONE STOPPED STATE 100, by the logic circuitry transmitting a no drive signal to the drive motor 22 to the particular accumulating zone. At this point, two events may occur. First, if the zone stop is inactive, and if at this point a product detect signal from the adjacent downstream module is not received by the logic circuitry of the current module, the module returns to the ZONE RUNNING STATE 80. Second, if the current zone becomes empty, the logic circuitry ceases its product detect signal to the adjacent upstream module, the UPSTREAM OUTPUT OFF 102, ceases its product detect signal to the adjacent downstream module, the DOWNSTREAM OUTPUT OFF 104, and proceeds to the ZONE RUNNING STATE 80.

The above paragraph detailed the module logic circuitry flow path with respect to a product being detected within the current accumulating zone and the receipt of a product detect signal from the adjacent downstream module. Now, the module logic circuitry flow path will be described starting at the CHECK STATUS DOWNSTREAM 94. If the current module is not receiving a product detect signal from the adjacent downstream module, indicating that the adjacent downstream zone is not occupied by a package, the flow proceeds to the CHECK ZONE STOP 106. If the zone stop feature is enabled (active), then the logic circuitry transmits a product detect signal to the adjacent upstream module, the UPSTREAM OUTPUT ON 98, and the program flows as described above.

If however, the zone stop is disabled (inactive) the program flow proceeds to the DOWNSTREAM OUTPUT ON 108 where the logic circuitry transmits a product detect signal to the adjacent downstream module. Then the logic circuitry checks the mode of operation of the module by checking to see if the slug mode has been enabled, the CHECK SLUG STATUS 110, since the singulation mode is the default mode. If the slug mode has not been chosen, and thus inactive, the module transmits a product detect signal to the adjacent upstream module, the UPSTREAM OUTPUT ON 116, and thereafter returns to the ZONE RUNNING STATE 80. This means that a product has been detected within the current accumulating zone, the singulation mode has been chosen, but since no package has been detected in the adjacent downstream accumulating zone, the package will proceed down the conveyor.

If however, from the CHECK SLUG STATUS 110, the module is set to the slug mode, the slug status is active and the logic circuitry proceeds to the CHECK JAM PROTECTION 112 to ascertain whether a jam protection feature has been enabled or disabled. If the jam protection feature has been disabled, the logic circuitry proceeds to the ZONE RUNNING STATE 80. If the jam protection feature is enabled or active, the logic circuitry proceeds to the START JAM TIMER 114, whereupon if the timer expires, the logic circuitry transmits a product detect signal to the adjacent upstream module, the UPSTREAM OUTPUT ON 116. This is because if a module detects the presence of a package within its zone for more than the timer period, it is assumed that the package is jammed on the conveyor. By sending a product detect signal to the adjacent upstream module, the upstream zones begin to accumulate packages until the jam is cleared.

With reference now to FIGS. 6–14, the overall operation of the accumulating conveyor will be described relative to packages entering the accumulating conveyor, being carried down the conveyor, and being discharged from the conveyor, when the control device is in the singulation mode, the slug mode, and the various features associated therewith. It should initially be understood that, 1) in FIGS. 6–9, the sequence of events are applicable to both the singulation mode and the slug mode; 2) in FIGS. 10 and 11, the sequence of events apply to the singulation mode only; 3) in FIGS. 12 and 13, the sequence of events are applicable to the slug mode only; and 4) in FIG. 14, the sequence of events applies to both the singulation and slug modes.

Figure 6:
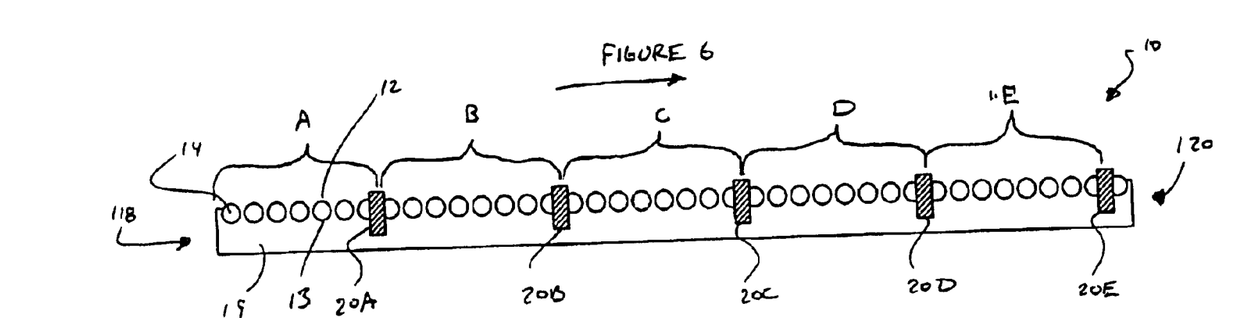
FIG. 6 is a diagrammatic representation of an empty accumulating conveyor of another embodiment of the present invention wherein the conveyor has five zones.

FIG. 6 depicts an empty accumulating conveyor 10 having five zones A–E with zone A at an infeed end 118 and zone E at the discharge end 120. The conveyor has no packages thereon and is thus empty. Zones B–E are sleeping (not running) assuming the sleep mode is enabled, indicating that there has not been any package for the set time period. Zone A however, is set to sleep mode disabled such that zone A is running in order to convey a package to the discharge of zone A and begin the "waking up" process. Zone E has its zone stop setting to active to cause the first carton to reach zone E to be stopped therein. In FIG. 7, a package P1 has entered zone A. Upon detection of the package P1 in zone A by the module 20A, a product detect signal is sent to the adjacent downstream module 20B. Upon receipt of a product detect signal from the adjacent upstream module 20A, module 20B transmits a drive signal to its controller 21 to "wake up" the motor 22 and the zone. Thus, the package P1 is transported from zone A into zone B.

Figure 8:
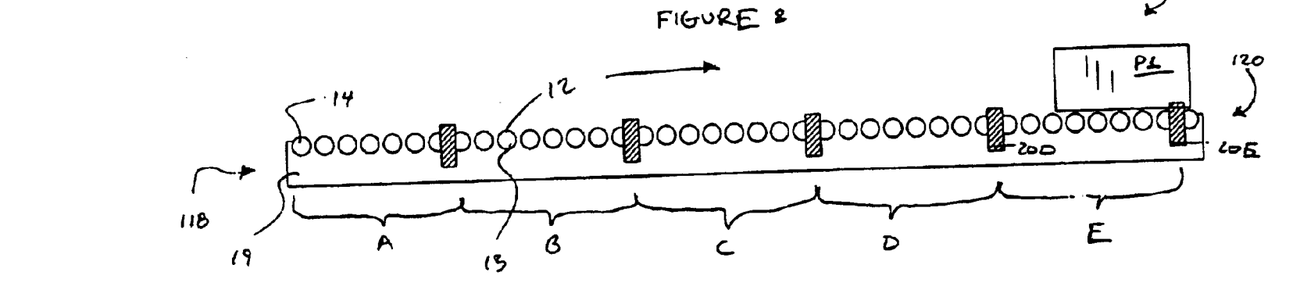
FIG. 8 is a diagrammatic representation of the conveyor of FIG. 6 with the package P1 having traveled to a discharge end in either a singulation or slug control modes.

Referring to FIG. 8, the package P1 has been transported all the way to zone E, the discharge zone. Each adjacent module from module 20B, in other words modules 20C and 20D, have run through the same sequence as described between modules 20A and 20B. However, when the package P1 reaches zone E, module 20E being set to zone stop enable, transmits a no drive signal to its controller 21 and drive motor 22 to stop the drive force in zone E. The module 20E simultaneously sends a product detect signal to the adjacent upstream module 20D. Zones D and C are still in the zone running state as their sleep timers will not yet have expired, while zone B is in the sleep mode as its sleep timer will have expired.

Figure 9:
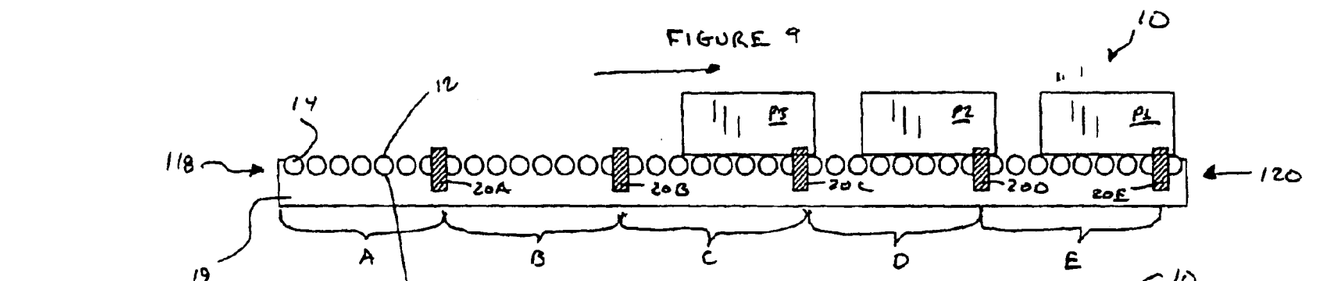
FIG. 9 is a diagrammatic representation of the conveyor of FIG. 6 wherein package P1 has been held at the discharge end and packages P2 and P3 have entered and traveled down the conveyor in either a singulation or slug control modes.

Assuming, that immediate discharge of package P1 from the conveyor 10 is not desired, FIG. 9 depicts the situation where two more packages P2, P3 have entered the conveyor. Package P2 travels down the conveyor as described above until it detected by module 20D. Since module 20D has already received a product detect signal from the adjacent downstream module 20E, the detection of the package P2 within its zone (zone D) will cause the module to transmit a no drive signal to stop its zone (again, zone D). Module 20D also sends a product detect signal to its adjacent upstream module 20C, and to its adjacent downstream module 20E. As package P3 travels down the conveyor 10 it is detected by module 20C. Since module 20C has already received a product detect signal from the adjacent downstream module 20D, the module 20C outputs a no drive signal to stop the zone, zone C. Module 20C also transmits a product detect signal to the adjacent upstream module 20B and to the adjacent downstream module 20D. Also, since no packages have entered the conveyor 10, zone B has gone to sleep.

Again, the sequence of events described above with reference to FIGS. 6–9 are applicable to both the singulation mode and the slug mode. If the zone E module 20E were not set to zone stop, the products would be discharged from the conveyor regardless of the mode, unless the products were too close together while in the singulation mode. In the singulation mode, the packages would momentarily stop within the zones to provide the proper spacing.

Figure 10:
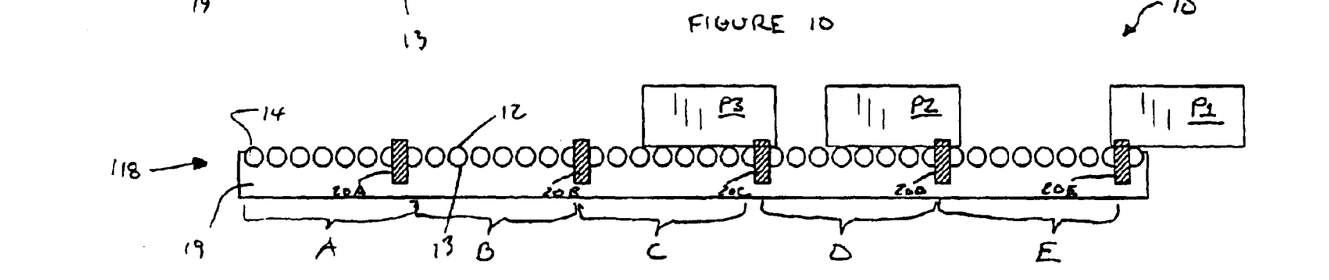
FIG. 10 is a diagrammatic representation of the conveyor of FIG. 9 wherein package P1 is being released with the control device set to singulation mode.
Figure 11:
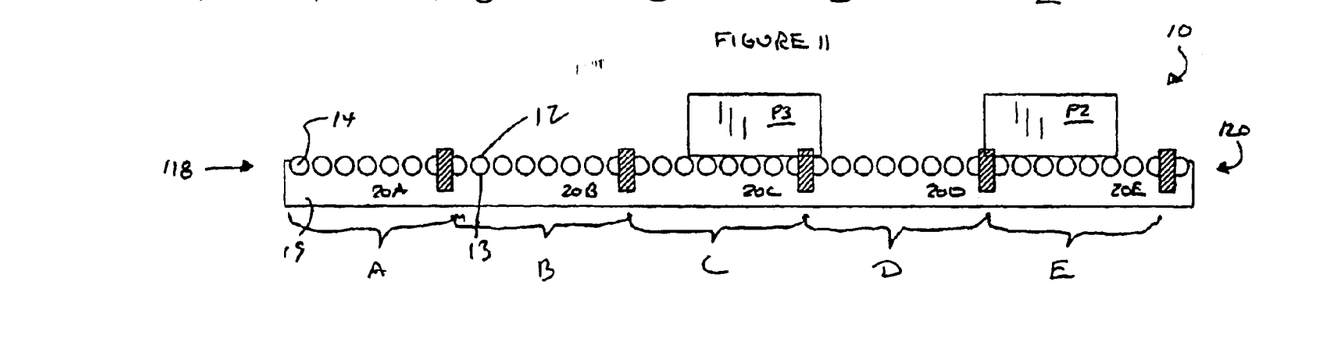
FIG. 11 is a diagrammatic representation of the conveyor of FIG. 10 releasing the package P2.

Referring to FIGS. 10 and 11, the discharge of packages from the conveyor will be described when the control device is set to the singulation mode. When it is desired to discharge the packages from the conveyor, the zone stop input to module 20E is disabled or set to inactive. This will cause the module 20E to send a drive signal to start the respective zone running since the module 20E will not be receiving a product detect signal from an adjacent downstream module in addition to the current product detect signal from its own sensor, because there is no downstream module. As the package travels along zone E, the module 20E will continue to send a product detect signal to the adjacent upstream module 20D until the entire package has cleared the module 20E.

Since module 20D is still receiving its own product detect signal and a downstream product detect signal, zone D remains stopped. This produces a gap between the packages approximately equal in length to the length of the zones, hence the term singulation. Once however, the package P1 has cleared the module 20E, the module 20E stops sending a product detect signal to the adjacent upstream module 20D causing the module 20D to send a drive signal to start the drive motor 22 for its zone, zone D. The package P2 continues to advance through zone D while zone C is still stopped since the zone D module 20D is still detecting a package. As the package P2 clears the module 20D, the product detect signal to the adjacent upstream module 20C ceases allowing the package P3 to begin its travel down the conveyor. The package P2 is discharged from the conveyor as explained above with reference to package P1, likewise with package P3.

Figure 12:
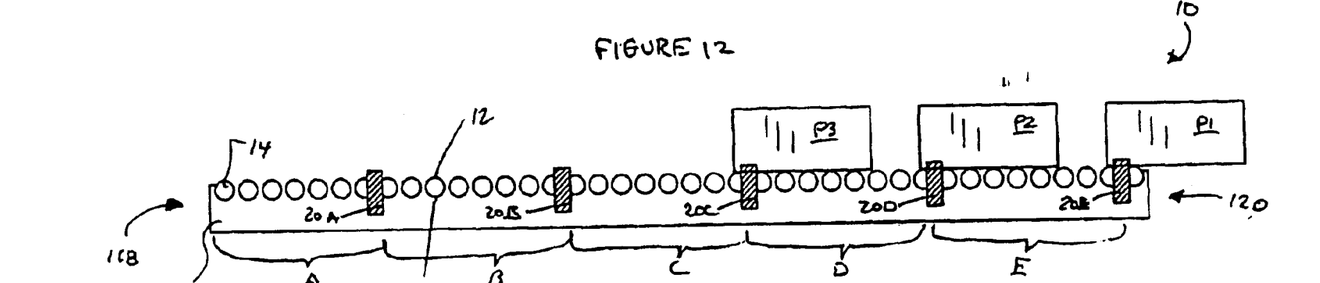
FIG. 12 is a diagrammatic representation of the conveyor of FIG. 9 wherein the packages are being released while the conveyor is in slug mode.

FIG. 12 depicts the release of packages after accumulation in FIG. 9 when the conveyor is in the slug mode. The zone stop input to module 20E has been set to inactive causing module 20E to change zone E to a running state, in turn causing zone E to begin discharge of package P1. In contrast to the singulation sequence, module 20E will not immediately send a product detect signal to the adjacent upstream module 20D even though a package P1 is still being detected by the module 20E, but instead starts the jam timer. If package P1 is still being detected by module 20E after the jam timer has expired, the product detect signal is then sent to the adjacent upstream module 20D.

Typically, the package P1 will have been discharged from the conveyor and thus will have traveled past the module 20E before the expiration of the jam timer, and thus the product detect signal is never sent to the adjacent upstream module 20D. At this point, since module 20D is no longer receiving a product detect signal from the adjacent downstream module 20E, zone D becomes active through the module 20D outputting a drive signal, thus advancing package P2. This process continues upstream until the packages have been discharged from the conveyor.

Figure 13:
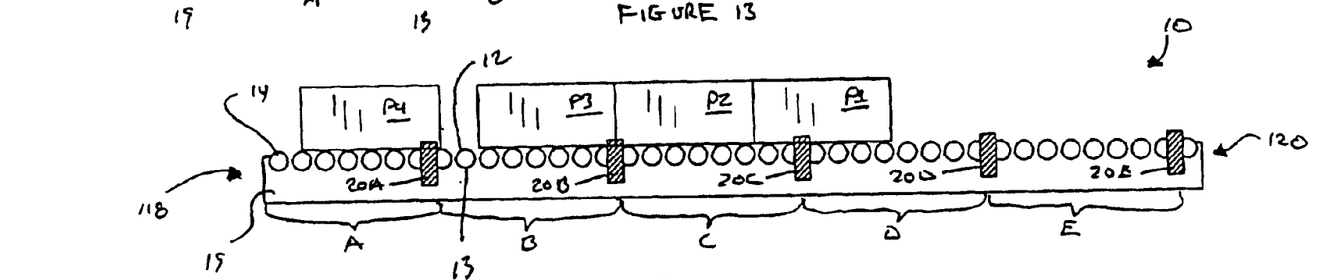
FIG. 13 is a diagrammatic representation of an accumulation conveyor with package P1 jammed and the other packages (P2, P3, P4) stacking up behind package P1 while the conveyor is in slug mode.

In FIG. 13, the jam protection feature is demonstrated as it applies to the slug mode. Package P1 is shown as being jammed between zones C and D, and is being detected by module 20C. Upon detection of package P1, module 20C begins the jam timer (in addition to sending a product detect signal to the adjacent downstream module 20D). Since the package P1 is jammed, the timer will expire (time out) thus, causing the module 20C to send a product detect signal to the adjacent upstream module 20B. While the jam timer for module 20C was operating, packages P2 and P3 were driven into the jammed package P1. When module 20B receives the product detect signal from the adjacent downstream module 20C, it will generate a no drive signal to stop the zone (zone B). Module 20B which is detecting package P3 also sends a product detect signal to the adjacent upstream module 20A, bypassing the jam timer in module 20B. When the package P4 then is detected by the module 20A, a no drive signal is generated by the module 20A to stop the zone A from running. Once the jammed package P1 is dislodged or removed, the conveyor returns to the normal slug mode state.

Again, with the jam protection enabled while in the slug mode, if a package becomes jammed at any zone for a predetermined time period (e.g. 6 seconds) or longer, packages on the upstream side of the jammed package will stop in sequence until the jammed package is dislodged or removed. The zone containing the jammed package will continue to drive, in many cases dislodging the jammed package without outside help. The zones will return to normal operating mode once the jam is cleared.

Figure 14:
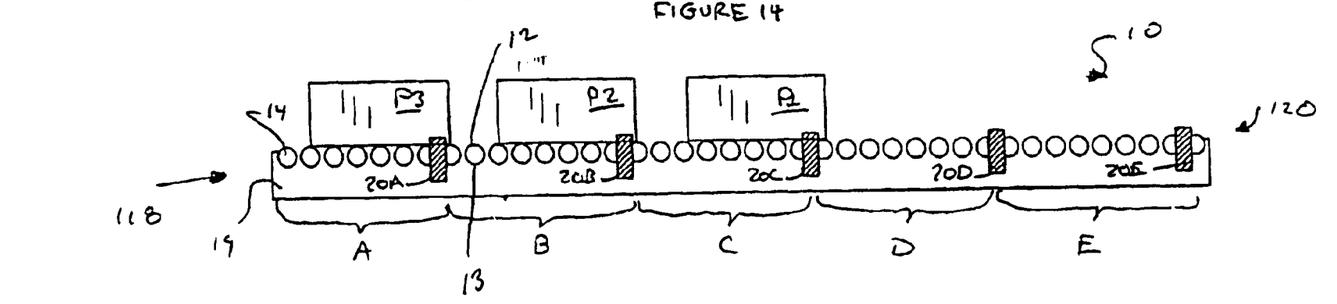
FIG. 14 is a diagrammatic representation of an accumulation conveyor illustrating use of a stop zone in accumulating zone C.

Finally, with reference to FIG. 14, the use of a stop zone wired in the middle of the conveyor is illustrated. In this instance a switch has been connected to the appropriate terminals of the terminal block of module 20C in order to make module 20C a zone stop. By setting the zone stop input of module 20C to active, module 20C is set up to stop the package P1 when it enters zone C. Packages P2 and P3 stop in zones B and A in accordance with the sequence described with reference to FIG. 9.

Figure 16:
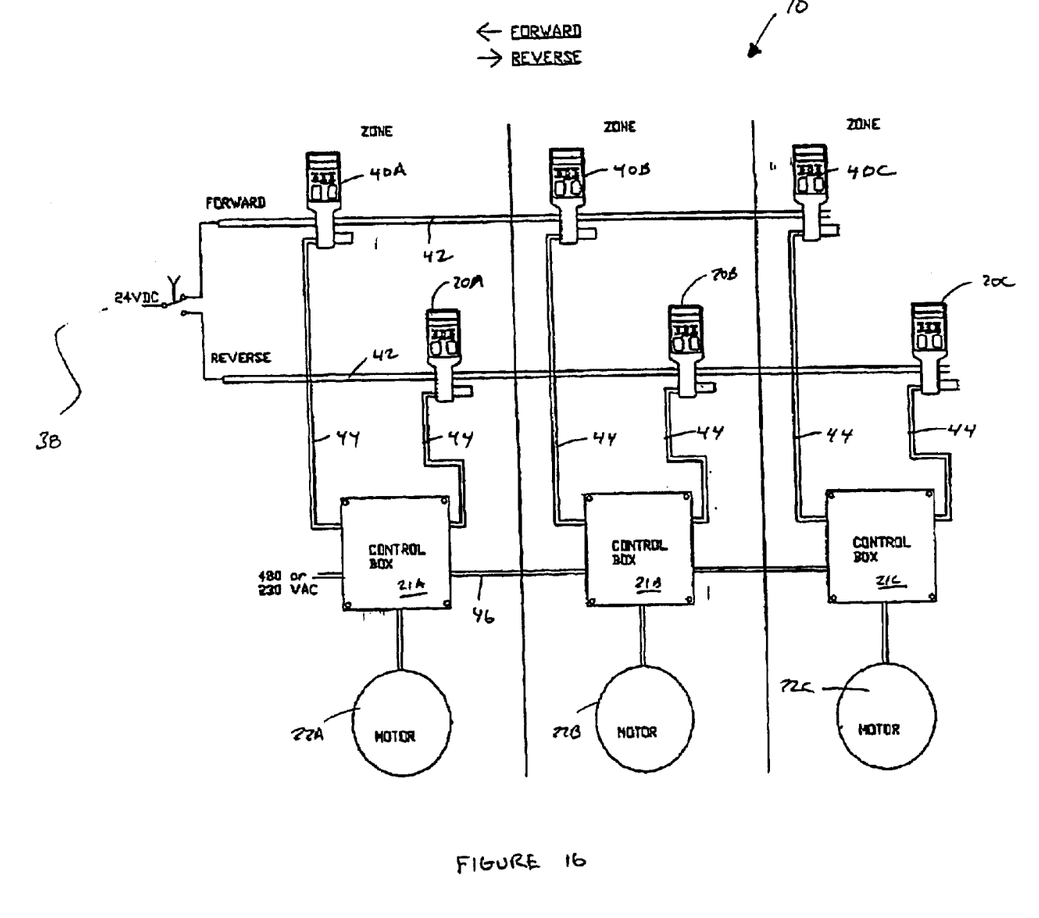
FIG. 16 is a wiring diagram of a conveyor system of another embodiment of the present invention including three zones and control logic modules arranged to control reverse, as well as forward, operation of the conveyor system.

A conveyor system 10 of yet another embodiment of the present invention that is wired for both forward and reverse movement of its upper conveying surface 12 is shown in FIG. 16. The conveyor system includes a first series of forward accumulation modules 20A–C, and a second series of reverse accumulation modules 40A–C for each of its three zones A–C. A direction switch 38 operably connects the first or second series 20 A–C or 40 A–C in a loop to the zone controllers 21. The zone controllers are operative to control the direction of operation of the motors 22A–C, including reversing the motors. Each of the first modules 20 is positioned under the conveying surface 12 and at the downstream end of its respective zone, similar to the aforedescribed embodiments. However, each of the second modules 40 are positioned at the upstream end (relative to normal, forward flow) of its respective zone. Using outputs of the second modules, accumulation flow can also be controlled in the reverse direction so as to maintain zero pressure.

The accumulation conveyor 10 of the present invention has many advantages. For instance, the use of one motor drive system in each of the accumulation zones allows each zone to be operated independently of the others. Conveyor size can be easily increased because each zone has its own logic module 20, controller 21 and gear motor 22. As another advantage, the ability of the control system to soft-start, or gradually increase the speed of, the motor reduces wear on the conveyor system 10 and allows more stable support for objects on the upper conveying surface 12. Soft starts also facilitate the use of fairly large motors, such as a motor with a torque rating of about 687 in-lb that is capable of conveying up to 3,000 lbs.

In addition, the use of a non-slip coupling 56 in the drive assembly reduces the noise, dust and power loss associated with clutch driven systems. For instance, sound level measurements were taken in a room having an ambient noise level of 50 dBA (slow response) at about 36 inches above the conveyor side rails of each conveyor and with each conveyor running at the same 30 fpm speed. Further, both conveyors were supported at approximately 18 inches above the floor, with the conventional conveyor resting on a rubber mat, and the conveyor system 10 of one embodiment of the present invention sitting directly on a concrete surface. Resulting measurements were 68 dBA (slow response) for the conventional clutch-driven conveyor versus 58 dBA slow response for the distributed drive system conveyor 10 of the present invention.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A conveyor system for supporting and moving a plurality of objects, said conveyor system comprising;

a plurality of zones each including a top conveying surface and a bottom surface, wherein the top and bottom surfaces define a space therebetween and wherein the top conveying surface is capable of moving in at least a downstream direction end of supporting one of the objects thereon;

a plurality of electrical motors wherein each of the electrical motors is positioned external to the space between the top and bottom surfaces of a respective one of the plurality of zones and wherein each electrical motor includes a drive shaft operable to drive the top conveying surface;

a control system operably connected to each of the electrical motors and capable of independently supplying power to each of the electrical motors such that the top conveying surface in one zone, and the object supported thereon, can be moved in the downstream direction independently of the other objects supported within the other zones; and a single power source, wherein the control system is configured to distribute electrical power from the single power source to the motor in each of the zones.

2. A conveyor system of claim 1, wherein each zone has a drive assembly including a non-slip coupling operably connecting the top conveying surface to the drive shaft of the electrical motor.

3. A conveyor system of claim 2, wherein the control system is further capable of controlling acceleration of the top conveying surface by controlling a speed of each of the electrical motors.

4. A conveyor system of claim 3, wherein the control system is further capable of controlling a frequency of power supplied to the motors so as to independently control the speed of each of the motors.

5. A conveyor system of claim 2, wherein the control system is capable of conducting a soft start wherein a speed of the motor is gradually increased.

6. A conveyor system of claim 1, wherein the electrical motors each have an output of at least 0.5 horsepower.

7. A conveyor system of claim 1, wherein the electrical motors each have a torque output of at least 687 in-lb.

8. A conveyor system of claim 1, wherein the top conveying surface is further capable of reverse movement in an upstream direction.

9. A conveyor system of claim 1, wherein the control system is capable of operating the electrical motors in a reverse direction.

10. A conveyor system of claim 1, wherein die top and bottom surfaces in each of the zones are defined by a plurality of rollers.

11. A conveyor system of claim 9, wherein each zone has a drive assembly configured to couple the drive shaft of the electrical motor to a driven one of the rollers and is further configured to slave the other rollers in the zone to the driven roller.

12. A conveyor system of claim 11, wherein the drive assembly includes a non-slip coupling connecting the drive shaft.

13. A conveyor system of claim 11, wherein the drive assembly further includes a chain and sprocket assembly slaving the other rollers to the driven roller.

14. A conveyor system of claim 8, wherein the control system includes a pair of sensors configured to sense the object in its zone.

15. A conveyor system of claim 14, wherein one of the sensors is positioned to detect downstream movement of the object supported on the top conveying surface and the other one of the sensors is positioned to detect upstream movement of the object on the top conveying surface.

16. A conveyor system of claim 14, wherein the one of the sensors is positioned at a downstream end of the zone and the other one of the sensors is positioned at the upstream end of the zone.

17. A conveyor system of claim 14, wherein the sensors are each positioned below the bottom surface.

18. A conveyor system of claim 1, wherein the control system includes a power controller and logic module in each zone and wherein said power controller and logic module cooperate to control the power supplied to the motor of the respective zone.

19. A conveyor system of claim 18, wherein the power controller and logic module has an upstream power and communication connection and a downstream power and communication connection allowing quick connection, and disconnection, of upstream and downstream zones.

20. A conveyor system for supporting and moving a plurality of objects, said conveyor system comprising:
    plurality of zones each including a top conveying surface and a bottom surface, wherein the top and bottom surfaces define a space therebetween and wherein the top conveying surface is capable of moving in at least a downstream direction and of supporting one of the objects thereon;
    a plurality of electrical motors wherein each of the electrical motors is positioned external to the space between the top and bottom surfaces of a respective one of the plurality of zones and wherein each electrical motor includes a drive shaft operable to drive the top conveying surface; and
    a control system operably connected to each of the electrical motors and capable of independently supplying power to each of the electrical motors such that the top conveying surface in one zone, and the object supported thereon, can be moved in the downstream direction independently of the other objects supported within the other zones;
    wherein the control system includes a power controller and logic module in each zone and wherein said power controller and logic module cooperate to control the power supplied to the motor of the respective zone; and
    wherein the power controller and logic module of each zone are further configured to detect current overload of the motor in the zone and reduce power supplied to the motor in response to detecting overload.

21. A conveyor system for supporting and moving a plurality of objects, said conveyor system comprising:
    a frame including a pair of laterally spaced support members extending in a machine direction;
    a plurality of zones separating the laterally spaced support members into discrete portions, where each zone includes a conveying surface extending between, and moveably support by, the discrete portions of the support members of the zone and wherein one of the rollers in each zone is a drive roller slaved to the other rollers in the zone via a chain and sprocket assembly;
    a plurality of electrical motors wherein each of the electrical motors includes a drive shaft operably connected to the conveying surface of a respective one of the zones via a non-slip coupling and wherein each of the motors is supported by one of the support member portions on a side of the support member portion opposite the conveying surface; and
    a control system operably connected to each of the electrical motors and capable of independently controlling electrical power supplied to each of the electrical motors such that the conveying surface, and any one of the objects supported thereon, can be moved in the machine direction independently of other objects supported on the conveying surfaces within the other zones;
    wherein the control system is further configured to distribute power from a single power source.

22. A conveyor system of claim 21, wherein the control system is further capable of controlling a speed of each of the electrical motors.

23. A conveyor system of claim 21, wherein the control system is capable of conducting a soft start wherein a speed of the electrical motor in its respective zone is gradually increased.

24. A conveyor system of claim 21, wherein the electrical motors each have an output of at least 0.5 horsepower.

25. A conveyor system of claim 21, wherein the electrical motors have a torque output of at least 687 in-lb.

26. A method of supporting and conveying a plurality of objects using an accumulation conveyor having a plurality of zones, said conveying method comprising:
    supporting the objects on a top conveying surface of the accumulation conveyor;
    sensing an empty one of a plurality of zones subdividing the top conveying surface not supporting one of the objects;

moving the conveying surface of an adjacent one of the zones upstream of the empty zone by energizing one of a plurality of electrical motors, wherein each of the electrical motors operably coupled to a respective one of the zones, and transmitting torque from the motor to the conveying surface with negligible slip; and controlling electrical power supplied to the motor by causing the electrical power to gradually increase so as to move, in a downstream direction, the top conveying surface of the zone upstream, and adjacent to, the empty zone so as to gradually accelerate and move an object front the upstream zone into the empty zone.

27. A method of claim 26, wherein transmitting torque includes transmitting a torque of at least 687 in-lb.

28. A method of claim 26, further comprising reversing movement of the conveying surface so as to move the top conveying surface of the zone downstream, and adjacent to, the empty zone so as to move an object from the downstream zone into the empty zone.

29. A control system for distributing power to a plurality of motors each positioned in a respective one of a plurality of zones of an accumulation conveyor supporting a plurality of objects thereon, said control system comprising;

a plurality of sensors, wherein each of the sensors is positioned in a respective one of the zones and wherein each of the sensors is configured to detect one of the objects supported by the conveyor in the zone;

a plurality of logic modules, wherein each of the logic modules is positioned in a respective one of each of the zones and is coupled in communication with the sensor in an adjacent, downstream one of the zones; and a plurality of power controllers, wherein each of the power controllers is coupled in communication with the logic module in its respective zone and is configured to activate the motor in its respective zone so as to move any one of the objects in its zone into the downstream, adjacent zone;

wherein the power controller are connected to a single power source.

30. A control system of claim 29, wherein each power controller has an upstream and downstream power connection.

31. A control system of claim 30, wherein the upstream power connection is at the end of a power line.

32. A control system of claim 31, wherein the power controllers are connected serially to the single power source via the power connections.

33. A control for distributing power to a plurality of motors each positioned in a respective one of a plurality of zones of an accumulation conveyor supporting a plurality of objects thereon, said control system comprising:

a plurality of sensors, wherein each of the sensors is positioned in a respective one of the zones and wherein each of the sensors is configured to detect one of the objects supported by the conveyor in the zone;

a plurality of logic modules, wherein each of the logic modules is positioned in a respective one of each of the zones and is coupled in communication with the sensor in an adjacent, downstream one of the zones; and a plurality of power controllers, wherein each of the power controllers is coupled in communication with the logic module in its respective zone and is configured to activate the motor in its respective zone so as to move any one of the objects in its zone into the downstream, adjacent zone;

wherein the power controllers are connected to a single power source; and wherein the power controllers are further configured to detect current overload of the motor in each zone and to reduce power supplied to the motor in response to detecting overload.

34. A control system of claim 29, wherein the power controller and logic module are in separate housings.

35. A conveyor system for supporting and moving a plurality of objects, said conveyor system comprising:

a plurality of zones each including a top conveying surface and wherein the top conveying surface is capable of moving in at least a downstream direction and of supporting one of the objects thereon;

a drive system capable of independently supplying power to each of the zones such that the top conveying surface in one zone, and the object supported thereon, can be moved in the downstream direction independently of the other objects supported within the other zones; and wherein the drive system generates a noise level of less than 18 dbA in excess of a background noise level.

36. A conveyor system of claim 35, wherein the drive system generates a noise level equal to or less than approximately 8 dbA in excess of the background noise level.

37. A conveyor system of claim 35, wherein the drive system further includes a roller-to-roller chain drive.

38. A conveyor system for supporting and moving a plurality of objects, said conveyor system comprising:

a plurality of zones each including a top conveying surface and a bottom surface, wherein the top and bottom surfaces define a space therebetween and wherein the top conveying surface is capable of moving in at least a downstream direction and of supporting one of the objects thereon;

a plurality of electrical motors wherein each of the electrical motors is positioned external to the space between the top and bottom surfaces of a respective one of the plurality of zones and wherein each electrical motor includes a drive shaft operable to drive the top conveying surface; and a control system operably connected to each of the electrical motors and capable of independently supplying power to each of the electrical motors such that the top conveying surface in one zone, and the object supported thereon, can be moved in the downstream direction independently of the other objects supported within the other zones;

wherein the control system includes a power controller and logic module configured to cooperate to control the power supplied to the motor of one or more of the zones; and wherein the power controller and logic module are further configured to detect current overload of the motor in one or more of the zones and reduce power supplied to the motor in response to detecting overload.

39. A conveyor system of claim 38, further comprising a single power source, wherein the control system is configured to distribute electrical power from the single power source to the motor in each of the zones.

* * * * *